United States Patent
Major et al.

(10) Patent No.: US 7,950,735 B2
(45) Date of Patent: May 31, 2011

(54) TEMPERATURE CONTROLLED VEHICLE SEATS

(75) Inventors: Gregory A. Major, Farmington Hills, MI (US); William R. Hill, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 344 days.

(21) Appl. No.: 12/098,503

(22) Filed: Apr. 7, 2008

(65) Prior Publication Data

US 2009/0250980 A1     Oct. 8, 2009

(51) Int. Cl.
*A47C 7/72*     (2006.01)
(52) U.S. Cl. .............................. 297/180.15; 297/180.14
(58) Field of Classification Search ............... 297/180.1, 297/180.15
See application file for complete search history.

(56) References Cited

U.S. PATENT DOCUMENTS

| | | | |
|---|---|---|---|
| 5,117,638 A | 6/1992 | Feher | |
| 5,138,851 A * | 8/1992 | Mardikian | ...................... 62/244 |
| 6,254,179 B1 * | 7/2001 | Kortum et al. | ........... 297/180.12 |
| 2005/0184565 A1 * | 8/2005 | Weiss et al. | .............. 297/180.15 |

FOREIGN PATENT DOCUMENTS

| | | |
|---|---|---|
| DE | 2524943 A1 | 12/1976 |
| DE | 4432497 A1 | 3/1996 |
| DE | 19645544 A1 | 5/1998 |
| DE | 19947567 A1 | 4/2001 |
| DE | 10242238 A1 | 5/2004 |
| GB | 2278432 A | 11/1994 |

* cited by examiner

*Primary Examiner* — Milton Nelson, Jr.

(57) ABSTRACT

A seat temperature control system having a temperature controlled seat for use in a vehicle is disclosed. The temperature controlled seat may comprise a seat bottom, a seat back and an air conditioning system. The seat bottom includes a bottom heat exchanger fluid coil configured to direct a cooling fluid therethrough from a bottom inlet end to a bottom outlet end. The seat back includes a back heat exchanger fluid coil configured to direct the cooling fluid therethrough from a back inlet end to a back outlet end. The air conditioning system includes a coils inlet line in fluid communication with the bottom inlet end and the back inlet end, and a coils outlet line in fluid communication with the bottom outlet end and the back outlet end. The air conditioning system provides cooling fluid to the coils and receives cooling fluid from the coils.

13 Claims, 4 Drawing Sheets

TEMPERATURE CONTROLLED VEHICLE SEATS

BACKGROUND OF INVENTION

The present invention relates generally to temperature controlled vehicle seats, and more particularly to vehicle seats having coils therein for passing refrigerant or coolant therethrough.

In order to improve the comfort of passengers in automotive vehicles, some have supplemented the vehicle heating, ventilation and air conditioning (HVAC) system with heated or cooled seats. For example, some seats include an electric element that heats up when a current is passed through it. Others route some of the cooled air from the HVAC system through the seats. While others employ thermoelectric based seat heating and cooling. These arrangements are meant to improve the passenger comfort by supplementing the heating or cooling provided by the vehicle HVAC system. But these seat systems do not achieve the heating and/or cooling as efficiently as is desired.

SUMMARY OF INVENTION

An embodiment contemplates a temperature controlled seat for use in a vehicle. The temperature controlled seat may comprise a seat bottom, a seat back and an air conditioning system. The seat bottom extends in a generally horizontal direction and includes a bottom heat exchanger fluid coil therein, with the bottom heat exchanger fluid coil configured to direct a cooling fluid therethrough from a bottom inlet end to a bottom outlet end. The seat back is located adjacent to the seat bottom and extends in a generally vertical direction and includes a back heat exchanger fluid coil therein, with the back heat exchanger fluid coil configured to direct the cooling fluid therethrough from a back inlet end to a back outlet end. The air conditioning system includes a coils inlet line in fluid communication with the bottom inlet end and the back inlet end, and a coils outlet line in fluid communication with the bottom outlet end and the back outlet end, with the air conditioning system configured to provide the cooling fluid to the coils inlet line and receive the cooling fluid from the coils outlet line.

An embodiment contemplates a seat temperature control system for a vehicle. The seat temperature control system may include a first temperature controlled seat and a first air conditioning system. The first temperature controlled seat includes a first seat bottom and a first seat back, with at least one of the first seat bottom and the first seat back including a first heat exchanger fluid coil therein configured to direct a cooling fluid therethrough from a first inlet end to a first outlet end. The first air conditioning system includes a first coils inlet line in fluid communication with the first inlet end and a first coils outlet line in fluid communication with the first outlet end, with the first air conditioning system configured to provide the cooling fluid to the first coils inlet line and receive the cooling fluid from the first coils outlet line.

An embodiment contemplates a seat temperature control system for a vehicle comprising a temperature controlled seat and a refrigeration unit. The temperature controlled seat includes a seat bottom and a seat back, at least one of the seat bottom and the seat back includes a heat exchanger fluid coil therein configured to direct a refrigerant therethrough from an inlet end to an outlet end. The refrigeration unit is mounted adjacent to at least one of the seat back and the seat bottom and includes an expansion device in fluid communication with the inlet end, a condenser in fluid communication with the expansion device, and an electrically driven compressor in fluid communication with the condenser and the outlet end.

An advantage of an embodiment is that the cooling and/or heating of vehicle seats is achieved relatively efficiently, thus providing additional passenger comfort with high efficiency. That is, improved time to occupant comfort is achieved with reduced energy consumption versus previous seat thermal management systems. Also, the cooling and/or heating of the seats can be accomplished before an occupant enters the vehicle, thus further improving passenger comfort.

DETAILED DESCRIPTION

Figure 1:
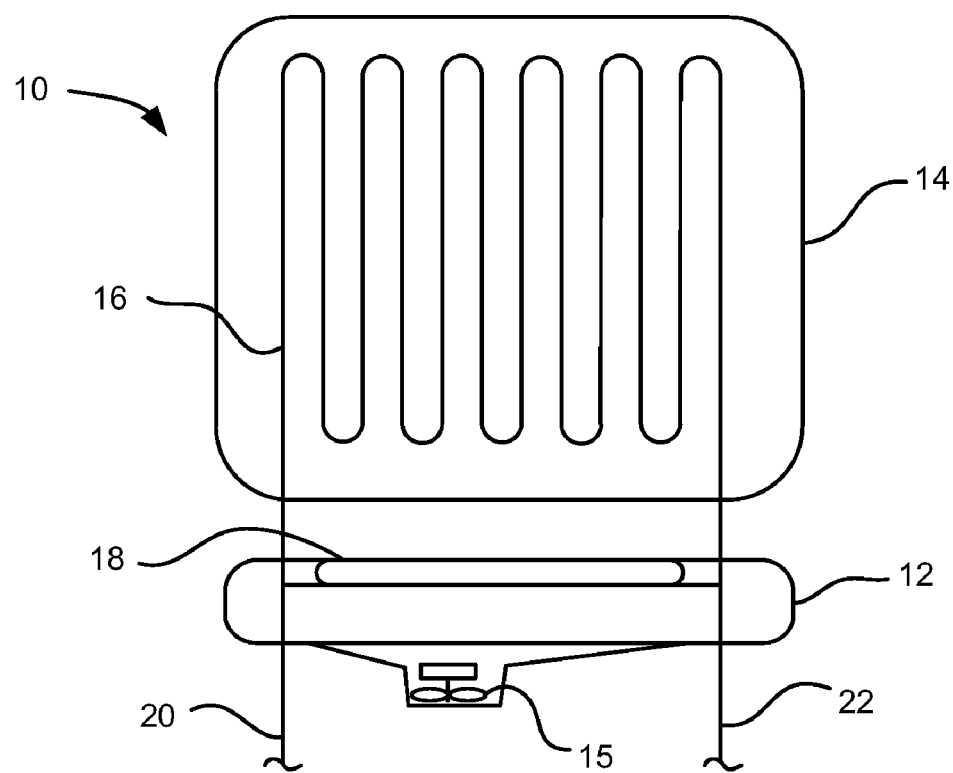
FIG. 1 is a schematic, front elevation view of a temperature controlled vehicle seat.
Figure 2:
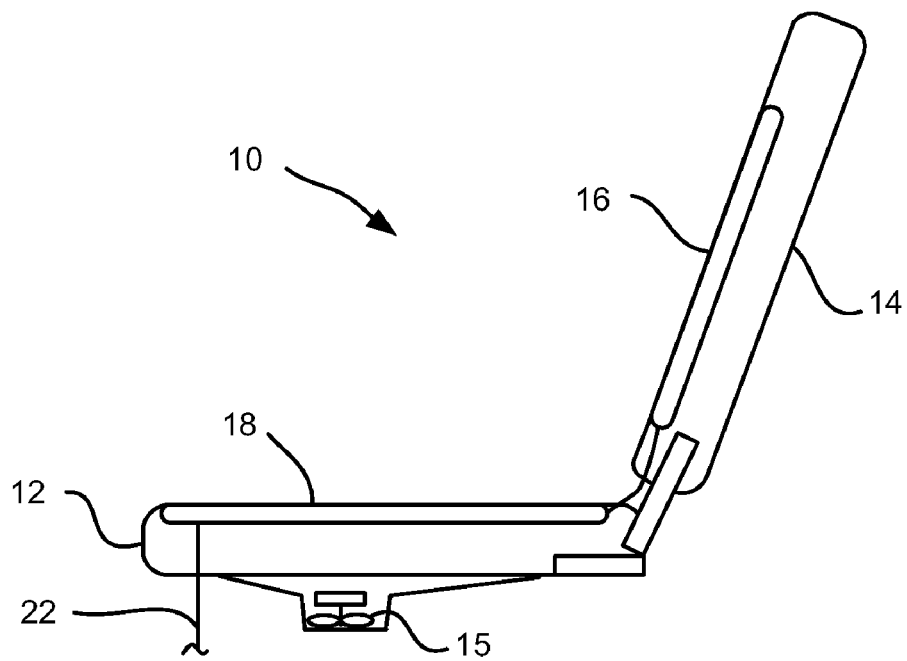
FIG. 2 is a schematic, side elevation view of a temperature controlled vehicle seat.

Referring to FIGS. 1-2, a temperature controlled seat, indicated generally at 10, is shown. The temperature controlled seat 10 includes a seat bottom 12 and a seat back 14. The seat bottom 12 may include a seat fan 15 for moving air through the seat bottom 12. Alternatively or in addition, a seat back fan (not shown) may also be employed. The seat back 14 includes heat exchanger fluid coils 16, and the set bottom 12 includes heat exchanger fluid coils 18. A coils inlet line 20 connects to the fluid coils 16, 18 for directing a fluid, such as refrigerant or a liquid coolant, into the fluid coils 16, 18. A coils outlet line 22 connects to the fluid coils 16, 18 for receiving the fluid from the coils 16, 18. The coils inlet and outlet lines 20, 22 connect to refrigerant systems (not shown in FIGS. 1 and 2), which will be discussed below relative to the various embodiments.

Figure 3:
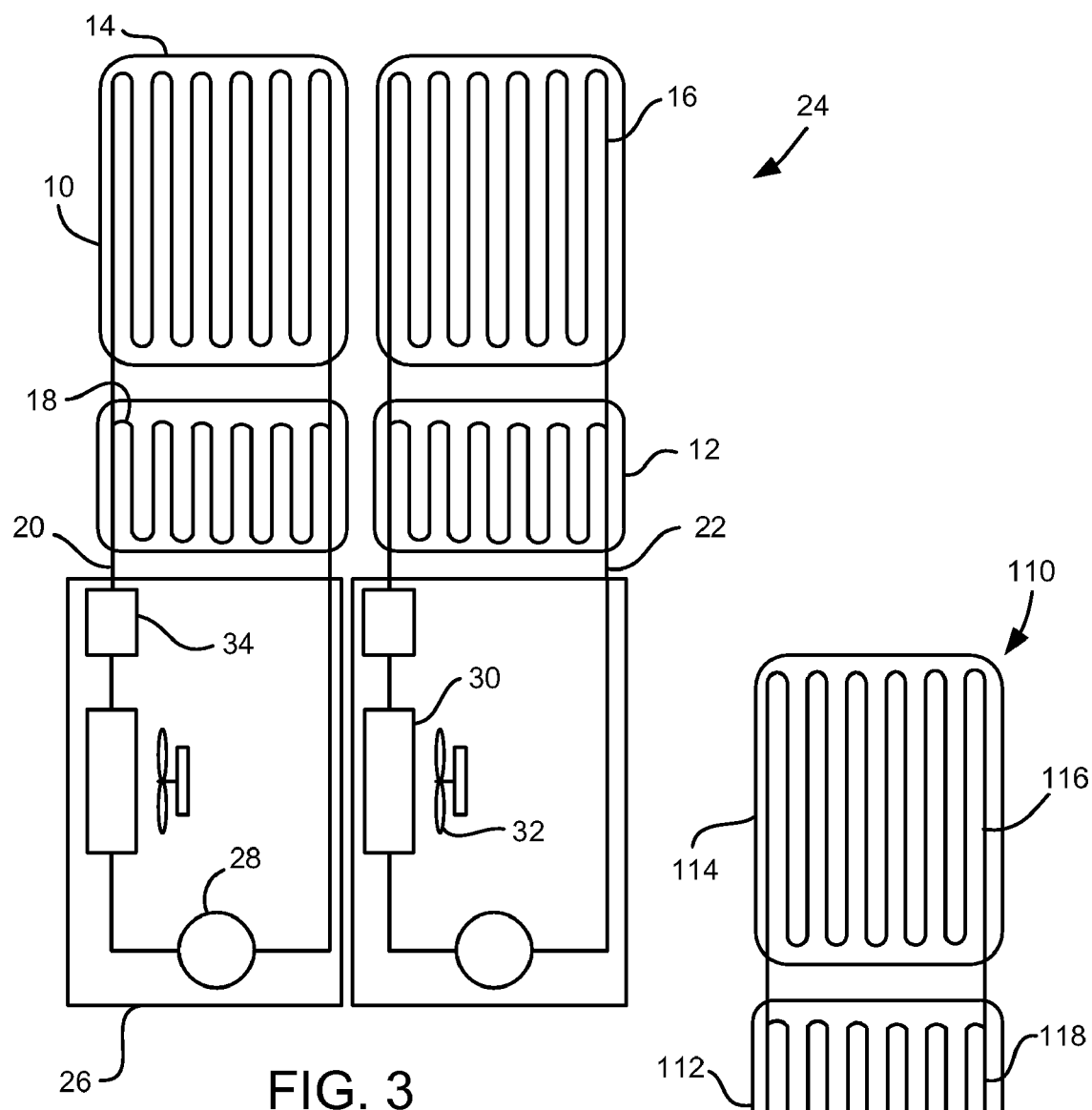
FIG. 3 is a schematic view of a seat temperature control system.

FIG. 3 illustrates a first embodiment of a seat temperature control system 24 having a pair of temperature controlled seats 10. The seats 10 may be, for example, a vehicle right front seat and left front seat. Of course, other numbers of seats 10 may be employed in this system 24. Each seat 10 has a seat bottom 12, with heat exchanger fluid coils 18, and a seat back 14, with heat exchanger fluid coils 16. The coils inlet and outlet lines 20, 22 for the left and right seats 10 connect, respectively, to left and right miniature refrigeration units 26, which form part of the seat temperature control system 24.

Each miniature refrigeration unit 26 includes a refrigerant compressor 28, a condenser 30, a fan 32 for moving air through the condenser 30, and an expansion device 34. The compressors 28 may include integrated electric motors or, alternatively, separate electric motors (not shown) may drive each of the compressors 28. Each fan 32 may also be driven by an electric motor. The expansion devices 34 may be, for example, orifice tubes, thermal expansion valves, or capillary lines.

The operation of the seat temperature control system 24 will now be discussed with reference to FIGS. 1-3. Upon a vehicle occupant requesting seat cooling for a particular seat 10, the compressor 28 and fan 32 for that seat 10 are activated. A vehicle HVAC system does not have to be operating for the seat cooling to take place. Refrigerant compressed by the compressor 28 flows through the condenser 30 where heat is removed. The refrigerant then flows through the expansion device 34, dropping the temperature of the refrigerant, and then flows through the coils inlet line 20 to the heat exchanger fluid coils 16, 18, of the seat back 14 and seat bottom 12, respectively. The heat exchanger fluid coils 16, 18 in effect act as an evaporator in a refrigerant loop, absorbing heat from the seat 10. The seat fan 15 may also be activated in order to facilitate heat transfer. The cooled seat 10, then, cools the vehicle occupant. Since each seat 10 has its own miniature refrigeration unit 26, each may have separate controls to allow for different rates of cooling for each seat 10.

Also, since the vehicle HVAC system does not need to be operating, the seat cooling may be accomplished as a preconditioning event prior to occupants entering the vehicle. For example, preconditioning of the seat 10 may occur simultaneously with a remote engine start feature on a hot day or may be a separate remotely activated feature.

On the other hand, if the HVAC system is operating during seat cooling, then the amount of seat cooling can be used as a factor to adjust the main HVAC system. That is, if the seat is at a certain temperature due to seat cooling, then the HVAC control temperature may be offset to account for this. Thus, the power consumption of the HVAC system may be reduced.

Figure 4:
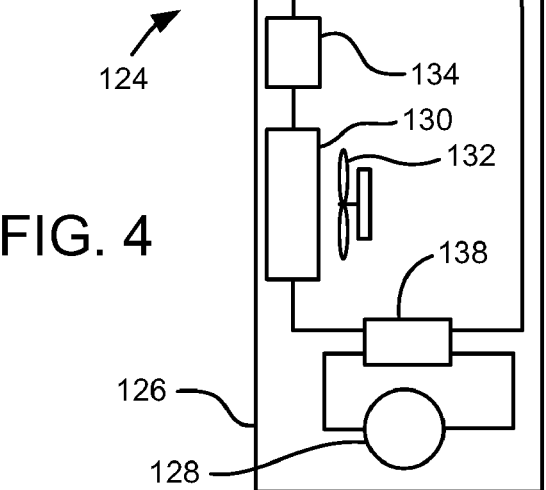
FIG. 4 is a schematic view of a second embodiment of a seat temperature control system.

FIG. 4 illustrates a second embodiment. Since this embodiment is similar to the first, similar element numbers will be used for similar elements, but employing 100-series numbers. While only one temperature controlled seat 110 is shown, more than one seat in a vehicle may be included as part of the seat temperature control system 124.

In this embodiment, the seat bottom and back 112, 114 still include heat exchanger fluid coils 118, 116, respectively. And, the heat exchanger fluid coils 116, 118 are connected to the miniature refrigeration unit 126. This miniature refrigeration unit 126, however, can now operate as a heat pump, thus providing both cooling and heating to the seat 110. The refrigeration unit 126 includes the expansion device 134, condenser 130 and fan 132. The refrigeration unit 126 also includes the compressor 128 connected to a four-way valve 138, allowing for the reversal in direction of flow of the refrigerant through the fluid coils 116, 188, expansion device 134 and condenser 130, thus allowing for seat heating in addition to seat cooling. While this refrigeration unit 126 may add more cost and complexity versus the cooling only unit of FIG. 3, it provides the additional capability of heating the seat 110.

Figure 5:
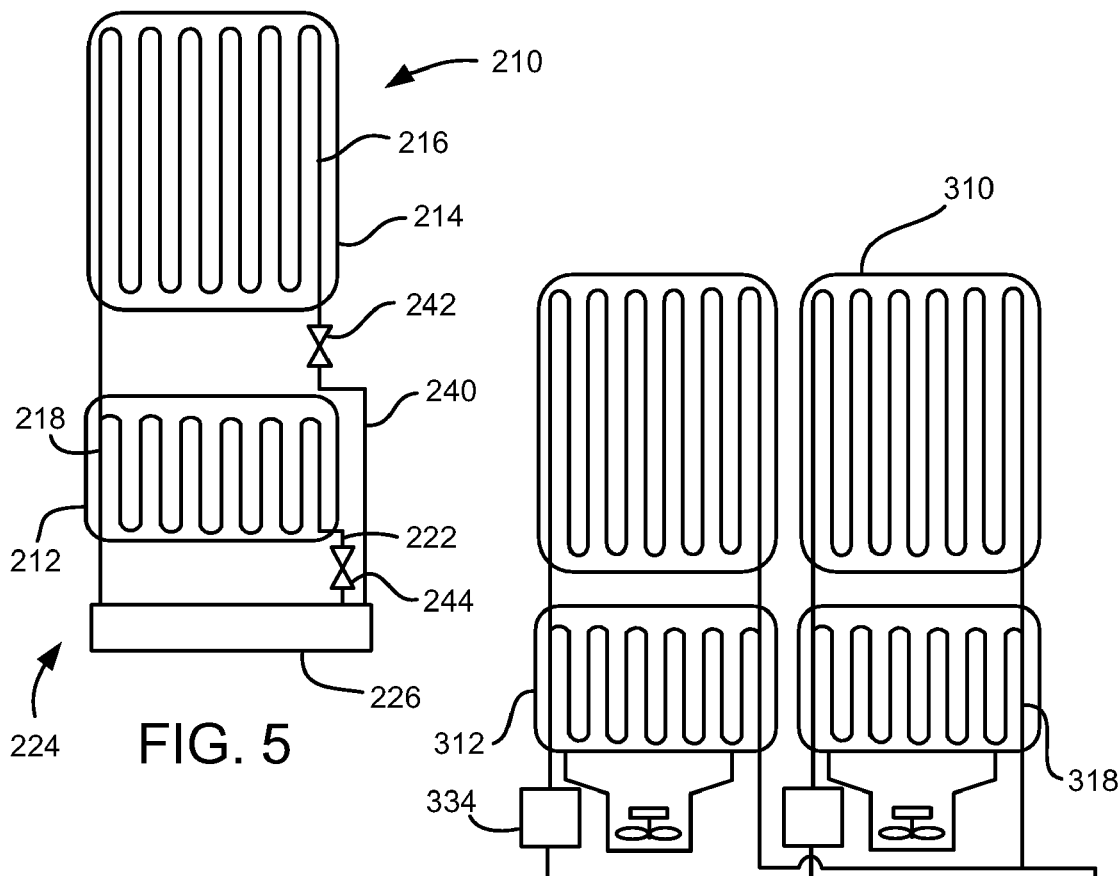
FIG. 5 is a schematic view of a third embodiment of a seat temperature control system.

FIG. 5 illustrates a third embodiment. Since this embodiment is similar to the first, similar element numbers will be used for similar elements, but employing 200-series numbers. While only one temperature controlled seat 210 is shown, more than one seat in a vehicle may be included as part of the seat temperature control system 224.

In this embodiment, the heat exchanger fluid coils 216 in the seat back 214 have a separate coils outlet line 240 connecting to the miniature refrigeration unit 226. This coils outlet line 240 includes a seat back shut-off valve 242 that can selectively stop the flow of refrigerant through the seat back fluid coils 216. Also, the coils outlet line 222 extending from the fluid coils 218 in the seat bottom 212 includes a seat bottom shut-off valve 244 that can selectively stop the flow of refrigerant through the seat bottom fluid coils 218. This provides added flexibility for the temperature controlled seat 210 in that a seat occupant may wish to only cool the seat back 214 or the seat bottom 212 rather than both.

The seat temperature control system 224 of this embodiment may include the additional functionality of the heat pump refrigeration unit described with reference to FIG. 4. In addition, to reduce the cost, one may employ only one of the two shut-off valves 242, 244—even though the functionality is now reduced somewhat.

Figure 6:
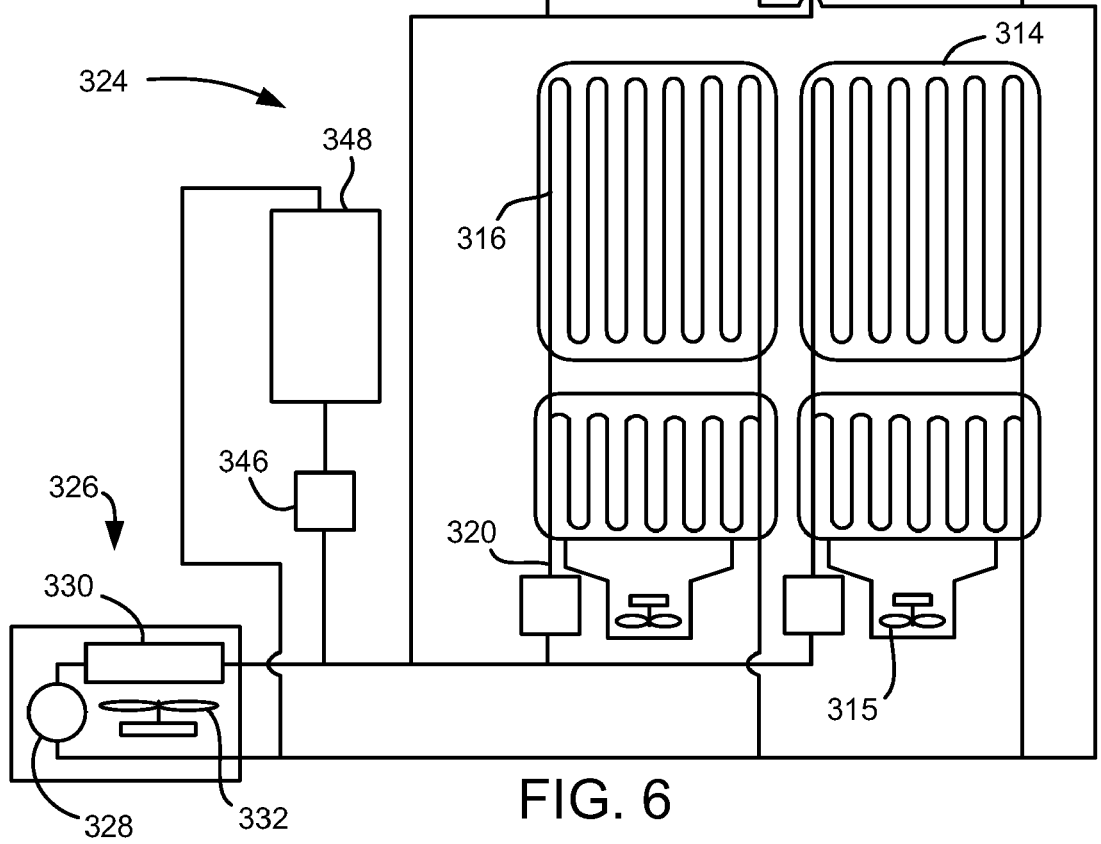
FIG. 6 is a schematic view of a fourth embodiment of a seat temperature control system.

FIG. 6 illustrates a fourth embodiment. Since this embodiment is similar to the first, similar element numbers will be used for similar elements, but employing 300-series numbers. This seat temperature control system 324 is shown with four temperature controlled seats 310, a right front seat, a left front seat, a right rear seat and a left rear seat. The number of seats 310 shown is only an example, and other numbers of seats may be included in the seat temperature control system 324.

In this embodiment, the refrigerant for the temperature controlled seats 310 is provided by the vehicle refrigerant system 326. The vehicle refrigerant system 326 includes a compressor 328, a condenser 330 and a fan 332, but the refrigerant flowing from the condenser 330 does not all flow through an expansion device 346 leading to an HVAC module evaporator 348. Some of the refrigerant is directed to individual expansion devices 334, each connected to the coils inlet line 320 for the corresponding seat 310. Each seat 310 also includes fluid coils 318 in the seat bottom 312 and fluid coils 316 in the seat back 314 and may include a seat fan 315.

While this embodiment minimizes the number of compressors and condensers in the vehicle (versus the previously discussed embodiments) and thus the cost, seat cooling is limited to operating only when the overall vehicle refrigerant system 326 is operating.

Figure 7:
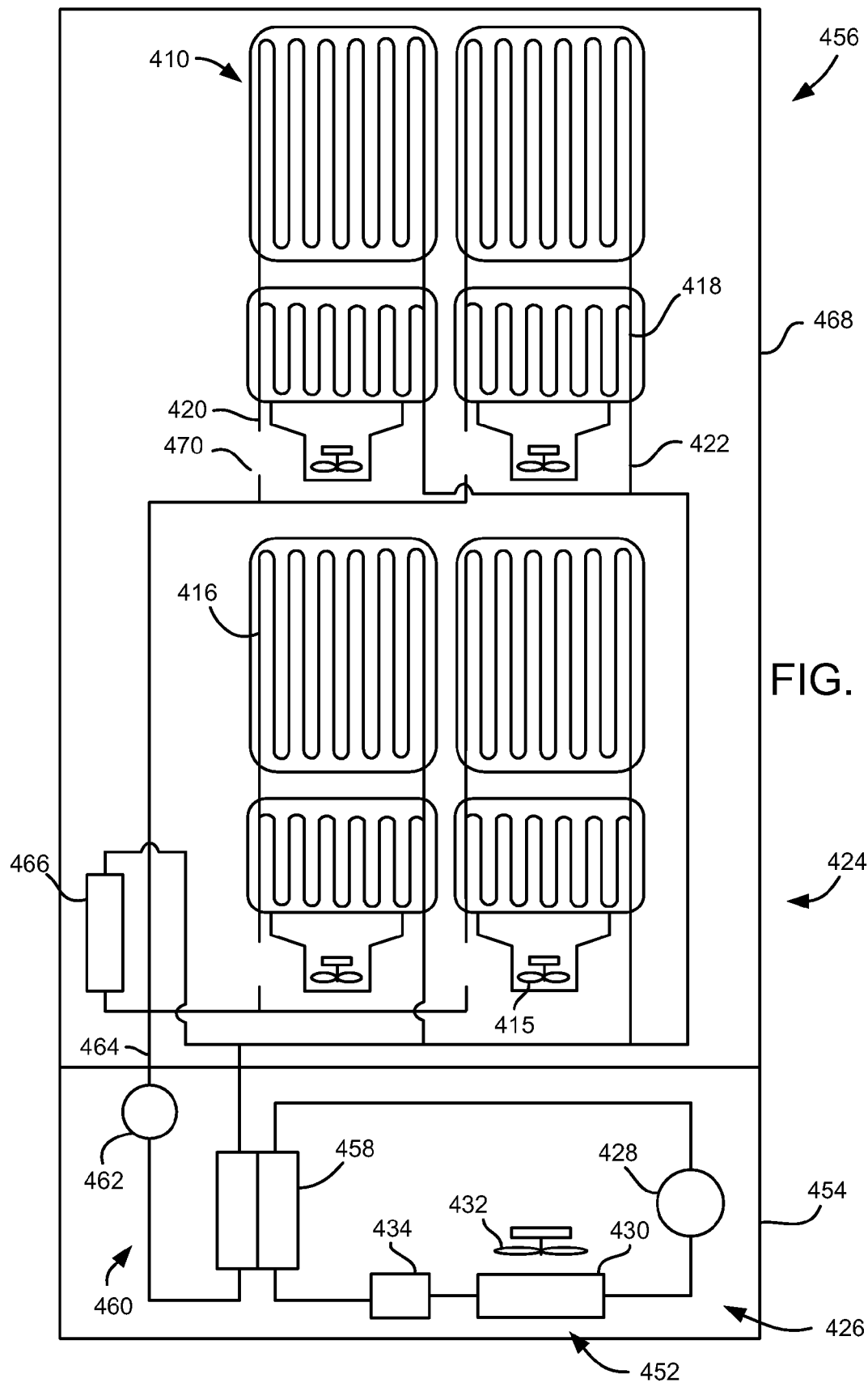
FIG. 7 is a schematic view of a fifth embodiment of a seat temperature control system.

FIG. 7 illustrates a fifth embodiment. Since this embodiment is similar to the fourth, similar element numbers will be used for similar elements, but employing 400-series numbers.

As with the fourth embodiment a vehicle air conditioning system 426 is employed rather than miniature refrigeration units for each seat in the seat temperature control system 424. However, this air conditioning system 426 is a secondary loop type of system. That is, the refrigerant (primary) loop 452 may be contained entirely within an engine compartment 454 of a vehicle 456. The primary loop 452 may include a compressor 428, a condenser 430, a fan 432 and an expansion device 434. Also, a refrigerant-to-liquid heat exchanger 458 is part of the primary loop 452 and a secondary (coolant) loop 460.

The secondary loop 460 employs a liquid, such as, for example, engine coolant, which transfers its heat to the refrigerant in the refrigerant-to-liquid heat exchanger 458. The secondary loop 460 may also include a liquid pump 462, a coolant inlet line 464 that directs the liquid to a chiller 466 and to coils inlet lines 420, coils outlet lines 422 that direct coolant back to the refrigerant-to-liquid heat exchanger 458, and seat back fluid coils 416 and seat bottom fluid coils 418 for each seat 410 that connect between the corresponding coils inlet and outlet lines 420, 422. The secondary loop 460 may be located partially in the engine compartment 454 and partially in a passenger compartment 468 of the vehicle 456.

Each seat 410 may also have a seat shut-off valve 470 for selectively blocking the flow of coolant into the coils 416, 418 for that particular seat 410. Accordingly, seats where no one is sitting will not be cooled. In addition, an extra valve and coolant line (not shown) may be added for each seat to allow the additional flexibility of controlling seat back cooling separate from seat bottom cooling (similar to that shown in FIG. 5). Also, each seat may have a seat fan 415 for facilitating the cooling effect for the seat occupants.

While certain embodiments of the present invention have been described in detail, those familiar with the art to which this invention relates will recognize various alternative designs and embodiments for practicing the invention as defined by the following claims.

What is claimed is:

1. A temperature controlled seat for use in a vehicle comprising:
    a seat bottom extending in a generally horizontal direction and including a bottom heat exchanger fluid coil therein, the bottom heat exchanger fluid coil configured to direct a cooling fluid therethrough from a bottom inlet end to a bottom outlet end;
    a seat back, adjacent to the seat bottom and extending in a generally vertical direction, including a back heat exchanger fluid coil therein, the back heat exchanger fluid coil configured to direct the cooling fluid therethrough from a back inlet end to a back outlet end;
    an air conditioning system including a coils inlet line in fluid communication with the bottom inlet end and the back inlet end, and a coils outlet line in fluid communication with the bottom outlet end and the back outlet end, the air conditioning system configured to provide the cooling fluid to the coils inlet line and receive the cooling fluid from the coils outlet line; and
    a shut-off valve configured to selectively block flow of the cooling fluid through one of the bottom heat exchanger fluid coil and the back heat exchanger fluid coil; and
    wherein the cooling fluid is a refrigerant, and the air conditioning system is a miniature refrigeration unit including an electrically driven compressor configured to receive the refrigerant from the coils outlet line, a condenser configured to receive the refrigerant from the compressor, an electrically driven fan configured to blow air through the condenser, and an expansion device configured to receive the refrigerant from the condenser and direct the refrigerant into the coils inlet line, the miniature refrigeration unit being mounted adjacent to at least one of the seat back and the seat bottom.

2. The temperature controlled seat of claim 1 wherein the seat bottom includes a seat fan configured to selectively blow air across the bottom heat exchanger fluid coil.

3. The temperature controlled seat of claim 1 wherein the shut-off valve is a seat back shut-off valve and the seat further includes a seat bottom shut-off valve, the seat back shut-off valve configured to selectively block flow of the refrigerant through the back heat exchanger fluid coil and the seat bottom shut-off valve configured to selectively block flow of the refrigerant through the bottom heat exchanger fluid coil.

4. The temperature controlled seat of claim 1 wherein the air conditioning system includes a four-way valve in fluid communication with the coils outlet line, the electrically driven compressor is configured to receive the refrigerant from and direct the refrigerant to the four-way valve, and the condenser is in fluid communication with the four-way valve; the four-way valve is configured to selectively reverse the direction of refrigerant flow through the condenser, the expansion device, the bottom heat exchanger fluid coil and the back heat exchanger fluid coil to selectively create a heat pump; and the miniature refrigeration unit is mounted adjacent to at least one of the seat back and the seat bottom.

5. A seat temperature control system for a vehicle comprising:
    a first temperature controlled seat including a first seat bottom and a first seat back, at least one of the first seat bottom and the first seat back including a first heat exchanger fluid coil therein configured to direct a refrigerant therethrough from a first inlet end to a first outlet end; and
    a first air conditioning system including a first coils inlet line in fluid communication with the first inlet end and a first coils outlet line in fluid communication with the first outlet end, the first air conditioning system configured to provide the refrigerant to the first coils inlet line and receive the refrigerant from the first coils outlet line; and
    wherein the first air conditioning system is a miniature refrigeration unit including a four-way valve in fluid communication with the first coils outlet line, an electrically driven compressor configured to receive the refrigerant from and direct the refrigerant to the four-way valve, a condenser in fluid communication with the four-way valve, an electrically driven fan configured to blow air through the condenser, and an expansion device in fluid communication with the condenser and the first coils inlet line; the four-way valve configured to selectively reverse the direction of refrigerant flow through the condenser, the expansion device, and the first heat exchanger fluid coil to selectively create a heat pump, with the miniature refrigeration unit being mounted adjacent to at least one of the first seat back and the first seat bottom.

6. The seat temperature control system of claim 5 further comprising:
    a second temperature controlled seat including a second seat bottom and a second seat back, at least one of the second seat bottom and the second seat back including a second heat exchanger fluid coil therein configured to direct the refrigerant therethrough from a second inlet end to a second outlet end.

7. The seat temperature control system of claim 5 wherein the other of the first seat back and the first seat bottom includes a second heat exchanger fluid coil therein configured to direct the refrigerant therethrough from a second inlet end to a second outlet end, the second inlet end in fluid communication with the first coils inlet line and the second outlet end in fluid communication with the first coils outlet line, the seat temperature control system including a shut-off valve configured to selectively block flow of the refrigerant through one of the first heat exchanger fluid coil and the second heat exchanger fluid coil.

8. The seat temperature control system of claim 5 including a seat fan configured to selectively blow air across the first heat exchanger fluid coil.

9. The seat temperature control system of claim 5 further comprising:
    a second temperature controlled seat including a second seat bottom and a second seat back, at least one of the second seat bottom and the second seat back including a second heat exchanger fluid coil therein configured to direct the refrigerant therethrough from a second inlet end to a second outlet end; and
    a second air conditioning system including a second coils inlet line in fluid communication with the second inlet end and a second coils outlet line in fluid communication with the second outlet end, the second air conditioning system configured to provide the refrigerant to the second coils inlet line and receive the refrigerant from the second coils outlet line.

10. The seat temperature control system of claim 9 wherein the second air conditioning system is a second miniature refrigeration unit including an electrically driven second compressor configured to receive the refrigerant from the second coils outlet line, a second condenser configured to receive the refrigerant from the second compressor, a second electrically driven fan configured to blow air through the second condenser, and a second expansion device configured to receive the refrigerant from the second condenser and direct the refrigerant into the second coils inlet line, the second miniature refrigeration unit being mounted adjacent to at least one of the second seat back and the second seat bottom.

11. A seat temperature control system for a vehicle comprising:
   a temperature controlled seat including a seat bottom and a seat back, at least one of the seat bottom and the seat back including a heat exchanger fluid coil therein configured to direct a refrigerant therethrough from an inlet end to an outlet end; and
   a refrigeration unit mounted adjacent to at least one of the seat back and the seat bottom and including an expansion device in fluid communication with the inlet end, a condenser in fluid communication with the expansion device, and an electrically driven compressor in fluid communication with the condenser and the outlet end; and
   wherein the refrigeration unit includes a four-way valve operatively engaging the compressor and configured to selectively reverse the direction of refrigerant flow through the condenser, the expansion device and the heat exchanger fluid coil to selectively create a heat pump.

12. The seat temperature control system of claim 11 wherein the other of the seat back and the seat bottom includes a second heat exchanger fluid coil therein configured to direct a refrigerant therethrough from a second inlet end to a second outlet end, the second inlet end in fluid communication with the expansion device and the second outlet end in fluid communication with the compressor, the seat temperature control system including a shut-off valve configured to selectively block flow of the cooled liquid through one of the heat exchanger fluid coil and the second heat exchanger fluid coil.

13. A seat temperature control system for a vehicle comprising:
   a first temperature controlled seat including a first seat bottom and a first seat back, at least one of the first seat bottom and the first seat back including a first heat exchanger fluid coil therein configured to direct a liquid cooling fluid therethrough from a first inlet end to a first outlet end;
   a second temperature controlled seat including a second seat bottom and a second seat back, at least one of the second seat bottom and the second seat back including a second heat exchanger fluid coil therein configured to direct the cooling fluid-therethrough from a second inlet end to a second outlet end;
   a first air conditioning system including a vehicle refrigerant system, a first coils inlet line in fluid communication with the first inlet end, a first coils outlet line in fluid communication with the first outlet end, a second coils inlet line in fluid communication with the second inlet end and a second coils outlet line in fluid communication with the second outlet end, the first air conditioning system configured to provide the cooling fluid to the first coils inlet line and receive the cooling fluid from the first coils outlet line; and
   wherein the vehicle refrigerant system has a primary loop including a compressor, a condenser, an expansion device and a refrigerant-to-liquid heat exchanger circulating a refrigerant therein; and a secondary loop for circulating the liquid therein and including the refrigerant-to-liquid heat exchanger, a pump configured to pump the liquid through the secondary loop, a HVAC module chiller, the first heat exchanger fluid coil, the second heat exchanger fluid coil, and a first shut-off valve configured to selectively block the flow of the liquid through the first heat exchanger fluid coil.

* * * * *